United States Patent [19]

Suganuma

[11] Patent Number: 5,637,948
[45] Date of Patent: Jun. 10, 1997

[54] ULTRASONIC MOTOR

[75] Inventor: Ryoichi Suganuma, Yokohama, Japan

[73] Assignee: Nikon Corporation, Tokyo, Japan

[21] Appl. No.: 380,191

[22] Filed: Jan. 30, 1995

Related U.S. Application Data

[63] Continuation of Ser. No. 099,122, Jul. 29, 1993, abandoned.

[30] Foreign Application Priority Data

Aug. 4, 1992 [JP] Japan .................................. 4-228028

[51] Int. Cl.$^6$ .................................................. H01L 41/08
[52] U.S. Cl. ........................................................ 310/323
[58] Field of Search ............................ 310/323, 328, 310/363, 364

[56] References Cited

U.S. PATENT DOCUMENTS

| | | | |
|---|---|---|---|
| 3,174,122 | 3/1965 | Fowler et al. | 310/328 X |
| 4,229,812 | 10/1980 | Holloway | 310/328 X |
| 4,587,452 | 5/1986 | Okumura et al. | 310/323 |
| 4,634,915 | 1/1987 | Mukoujima et al. | 310/323 |
| 4,634,916 | 1/1987 | Okada et al. | 310/323 |
| 4,739,212 | 4/1988 | Imasaka et al. | 310/323 |
| 4,743,788 | 5/1988 | Takagi et al. | 310/323 |
| 4,978,882 | 12/1990 | Kitani | 310/323 |
| 5,034,646 | 7/1991 | Shirasaki | 310/323 |
| 5,066,884 | 11/1991 | Takagi et al. | 310/323 |
| 5,408,156 | 4/1995 | Kawasaki et al. | 310/323 |

OTHER PUBLICATIONS

Patent Abstracts of Japan, vol. 012, No. 447 (E–685) 24 Nov. 1988.

*Primary Examiner*—Mark O. Budd
*Attorney, Agent, or Firm*—Shapiro and Shapiro

[57] ABSTRACT

An ultrasonic motor has a stator and a rotor which is pressure-contacted to be in contact with the stator and is driven by a travelling oscillatory wave. The stator comprises: a second layer having an electromechanical energy conversion element; a first layer having an elastic member to be excited by the electromechanical energy conversion element to generate the travelling oscillatory wave; and an one or more ply third layer between the first and the second layers whose spring modulus is smaller than those of the two layers and which is made of the same material as or different material from those of the two layers.

42 Claims, 7 Drawing Sheets

ULTRASONIC MOTOR

This is a continuation of application Ser. No. 08/099,122 filed Jul. 29, 1993, now abandoned.

BACKGROUND OF THE INVENTION

1. Field of the Invention

The present invention relates to an ultrasonic motor, more specifically, to improvement in constitution of a stator and a support mechanism thereof.

2. Related Background Art

Ultrasonic motors which can give a large amount of power at low speed drive have been wanted in many industrial fields as preferable actuators. And their constitution and operation principles are well disclosed in many articles in magazines, laid-open patents, and the like.

First, the constitution and operation of a conventional ultrasonic motor will be described.

Figure 1:
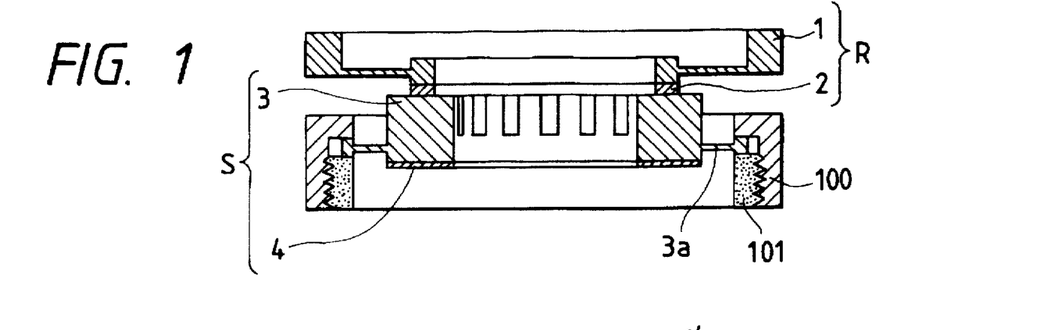
FIG. 1 is a cross-sectional view showing an example of the conventional annular ultrasonic motor.

FIG. 1 is a cross-sectional view of an example of the conventional annular ultrasonic motor.

A rotor R consists of a driven element 1 and a slide member 2 which is bonded to the bottom surface of the driven element 1. A stator S consists of an elastic member 3 and an electromechanical energy conversion element 4 such as a piezoelectric member which is bonded to the bottom surface of the elastic member 3. The periphery of the elastic member 3 is attached to support members 100 and 101 by a flange portion 3a provided in the vicinity of a neutral axis, while the rotor R is pressed to be in contact with the stator S by a pressure mechanism (not shown).

Figure 2:
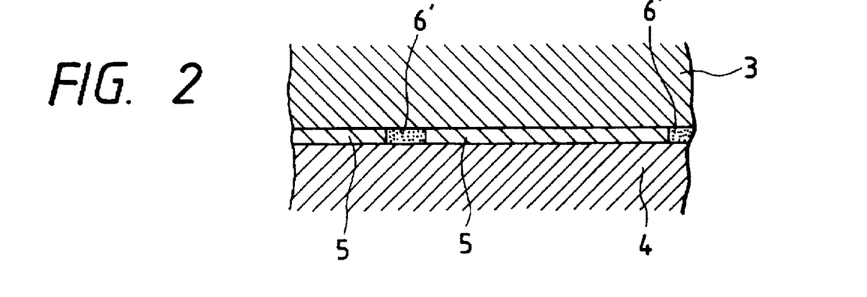
FIG. 2 is an enlarged cross-sectional view of the stator of the ultrasonic motor shown in FIG. 1.

FIG. 2 is an enlarged view of part of cross-section of the stator S of the ultrasonic motor shown in FIG. 1.

On the piezoelectric member 4, electrodes 5 of silver, or the like are formed by printing followed by baking or deposition. The piezoelectric member 4 is bonded to the elastic member 3 by an adhesive material layer 6'.

Figure 3:
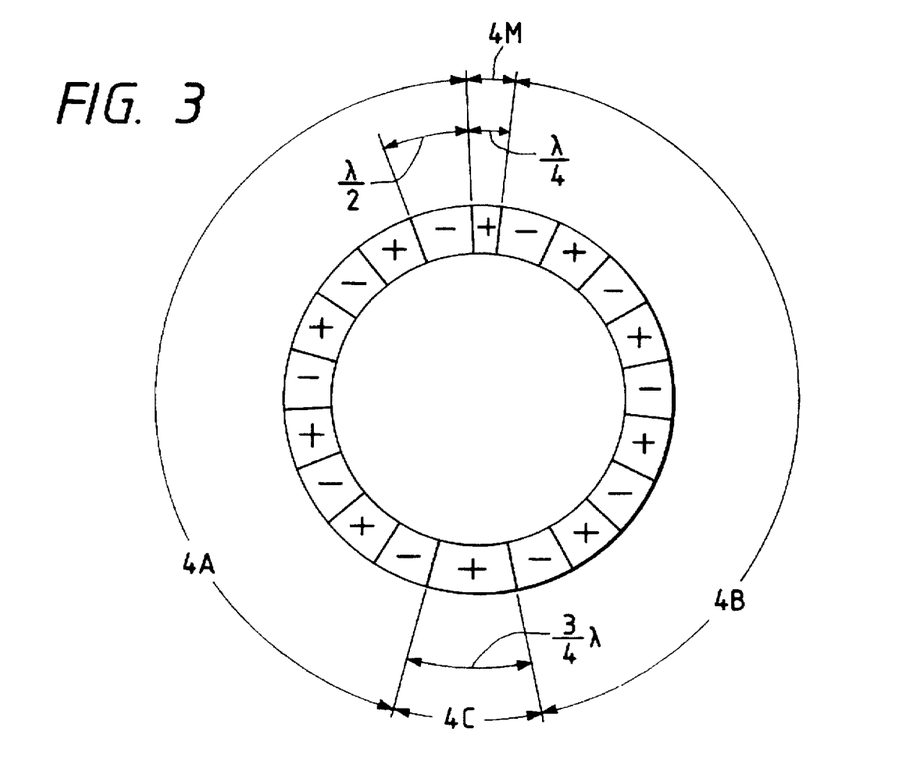
FIG. 3 is a view showing arrangement of electrodes formed on the piezoelectric member shown in FIG. 1.

FIG. 3 is a view illustrating arrangement of the electrode formed on the piezoelectric member 4 shown in FIG. 1.

Electrodes 4A, 4B, 4C and 4M polarize the piezoelectric member 4 as well as apply electric power to drive the ultrasonic motor. Signs "+" and "−" in this figure indicate directions of polarization of respective electrodes 4A, 4B, 4C and 4M.

The input electrodes 4A and 4B are electrode groups consisting of electrodes having peripheral length of $\lambda/2$ and having spatial phases different from each other by $\lambda/4$. The monitor electrode 4M having length of $\lambda/4$ is generally used to detect condition of a travelling oscillatory wave (described later) which is generated in the elastic member 3. The electrode 4C, which is generally called a common electrode, is used as ground.

The piezoelectric member 4 is bonded to the elastic member 3 as described above. By applying AC signals having phases different from each other by $\pi/2$ to respective electrode groups 4A and 4B formed on the piezoelectric member 4, the travelling oscillatory wave is generated in the elastic member 3, thereby driving the rotor R pressure-contacted against the stator S.

Though the above-mentioned conventional ultrasonic motor can give a large amount of power at low speed drive and can be applied in many ways, drive efficiency is low. More specifically, while drive efficiency of a DC motor is typically about 80%, the maximum drive efficiency of an ultrasonic motor is only about 30–40%.

Bad drive efficiency considerably restricts allowable drive time of, for example, various kinds of apparatus using batteries as their power sources.

Further, of electric power applied to the ultrasonic motor, the part which can not be taken out as driving force is consumed to generate heat, thereby rising temperature of the stator. Accordingly, the operation of the ultrasonic motor is restricted when temperature rises beyond an allowable point. As a result, the application of the ultrasonic motor is limited.

Furthermore, temperature rising of the stator may change the characteristics of the ultrasonic motor.

SUMMARY OF THE INVENTION

A first object of the present invention is to solve the above-mentioned problems and provide an ultrasonic motor which can improve drive efficiency and prevent temperature rising of the stator.

A second object of the present invention is to provide an ultrasonic motor having a support mechanism which improves drive efficiency.

In order to solve the above-mentioned problems, an ultrasonic motor according to the present invention may comprise: a stator S which consists of an electromechanical energy conversion element 4 such as a piezoelectric member and an elastic member 3 excited by the piezoelectric member to generate a travelling oscillatory wave; and a rotor R which is pressed to come into contact with said stator S and is driven by said travelling oscillatory wave, wherein between a first layer I (the elastic member of the stator) and a second layer II (the piezoelectric member of said stator), a one or more ply third layer III is formed whose spring modulus is smaller than those of said first and second layers and which is made of the same material as or different material from those of said two layers.

In such constitution, said third layer may be characterized as a buffer layer which prevents the travelling oscillatory wave from returning from the first layer to the second layer.

The third layer may also be characterized as an energy storage layer which transmits vibrational energy but does not vibrate itself.

Further, the third layer may include an adhesive material layer whose thickness is 3 μm or more.

Still further, the third layer may include a spacer for obtaining thickness.

Also, the third layer may be elongated outwardly in order to support the stator.

According to the present invention, since the third layer is provided between the elastic body (the first layer) and the electromechanical energy conversion element (the second layer) which constitute the stator, drive efficiency of the ultrasonic motor can be improved and temperature rising of the stator can be reduced.

In addition, since the third layer which does not vibrate is elongated outwardly to support the stator, a support mechanism having excellent drive efficiency can be realized.

DESCRIPTION OF THE PREFERRED EMBODIMENTS

Now, embodiments of the present invention will be described below in detail with reference to drawings.

Figure 4:
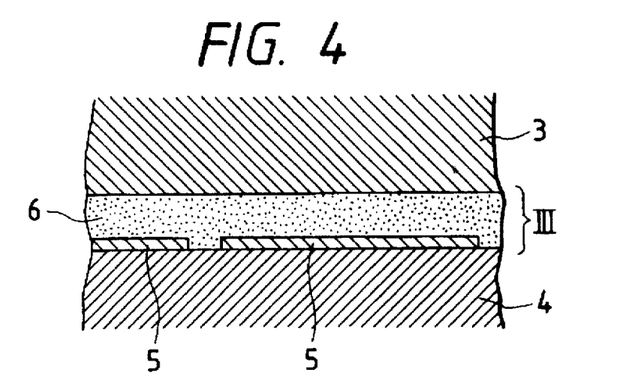
FIG. 4 is an enlarged cross-sectional view showing part of the first embodiment of the ultrasonic motor according to the present invention.

FIG. 4 is an enlarged cross-sectional view showing part of the first embodiment of the ultrasonic motor according to the present invention. Incidentally, in the following description of the embodiments, the same components as those in the above-mentioned conventional example are indicated by the same referential numerals and symbols, and description thereof is not repeated.

In the first embodiment, as shown in the enlarged view in FIG. 4, the electrodes 5 made of silver, or the like are formed on the electromechanical energy conversion element 4, such as a piezoelectric member, and the elastic member 3 and the piezoelectric member 4 are connected with each other through the third layer III.

As the third layer III, a material whose internal loss is small and which is softer than the elastic member 3 and the piezoelectric member 4 is preferably used. For example, the third layer III may be formed as an epoxy-, urethane- or acrylate-adhesive material layer 6. Instead of forming the adhesive material layer 6, the third layer III may be formed by filling preferable material such as resin material.

Adhesives used to form the third layer III are often electrically non-conductive. In this case, in order to apply a drive signal to the electrodes 5, respective electrodes 5 are electrically connected and led out to the side surface of the piezoelectric member 4 by means of conductive coating material. Or, the electrodes 5 are connected with unused electrodes formed on the opposite surface (opposite with respect to the elastic member 3) of the piezoelectric member 4, or are led out to said unused opposite surface. Thus, the drive signal can be applied to the electrodes 5.

Now, comparison with the constitution of the stator in the conventional ultrasonic motor is made. The adhesive material layer 6' shown in FIG. 2 generally has a thickness of about 0.1–3 μm except intervals between the electrodes 5.

In this embodiment, as shown in FIG. 4, the third layer III formed between the elastic member 3 (the first layer I) and the piezoelectric member 4 (the second layer II) improves drive efficiency of the ultrasonic motor. Incidentally, the elastic member 3, the piezoelectric member 4 and the electrodes 5 thereon are the same as those in FIG. 2. The adhesive material layer 6 is thicker than the adhesive material layer 6' shown in FIG. 2, as the thickness is 3 μm or more in this embodiment.

Though, in FIGS. 2 and 4, the surfaces of the electrodes shown in FIG. 3 are bonded on the surface of the elastic member 3, the rear sides of said electrode surfaces may be formed as a ring-shaped common electrode which is to be bonded. In this case, there are no intervals as shown in FIGS. 2 and 4, and a more uniform adhesive material layer can be obtained.

Next, general principles of the ultrasonic motor according to the present invention will be described. By providing the above-mentioned third layer III between the piezoelectric member 4 and the elastic member 3, as in this embodiment, the vibration loss in the stator can be reduced.

Figure 5:
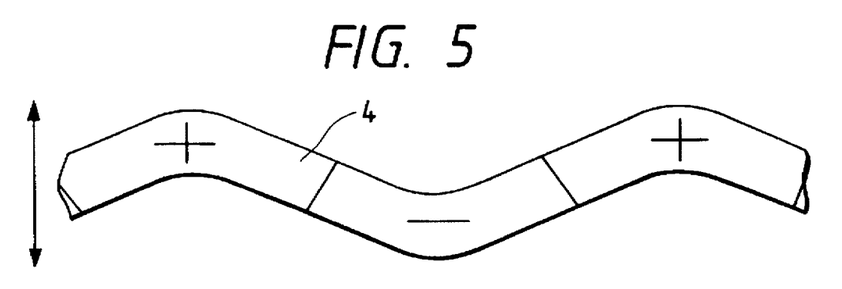
FIG. 5 is a view explaining curvature movement of the piezoelectric member of the present invention.

This can be explained as follows. When the drive signals are applied to the piezoelectric member 4, the piezoelectric member 4 starts curvature movement as shown in FIG. 5, where the direction of vibration is indicated by the arrow. Vibration transmitted to the elastic member 3 generates the travelling oscillatory wave in the elastic member 3 because drive signals applied to the above-mentioned electrodes 4A and 4B have phases different from each other by $\pi/2$.

In this case, the piezoelectric member 4 behaves obstructively with respect to the vibration of the travelling oscillatory wave generated in the elastic member 3. More specifically, as the travelling oscillatory wave is constantly travelling on the elastic member 3, the positions of the crests of the wave are also shifting with time. On the other hand, vibration of the piezoelectric member 4 is regarded as a standing wave which vibrates constantly at the same position. Therefore, the relation between phases of these two waves is not fixed. Accordingly, the piezoelectric member 4, which is the source of vibration, also behaves obstructively with respect to the vibration of the travelling oscillatory wave. Further, in some cases in which the phases of the two waves have certain relation to each other, the piezoelectric member 4 cannot effectively transmit vibration to the elastic member 3.

In order to solve the above-mentioned problem, according to the present invention, the third layer III, for example, the adhesive material layer 6 is formed between the piezoelectric member 4 and the elastic member 3. The adhesive material layer 6 suppresses an obstruction to the travelling oscillatory wave owing to vibration of the piezoelectric member 4 as well as efficiently transmits vibrational energy from the piezoelectric member 4 to the elastic member 3, thereby improving drive efficiency.

The above-mentioned function of the adhesive material layer is completely different from that of the conventional adhesive material layer 6' which only fixedly bonds the piezoelectric member 4 and the elastic member 3 to each other. The difference will be briefly described with reference to FIG. 6.

Figure 6:
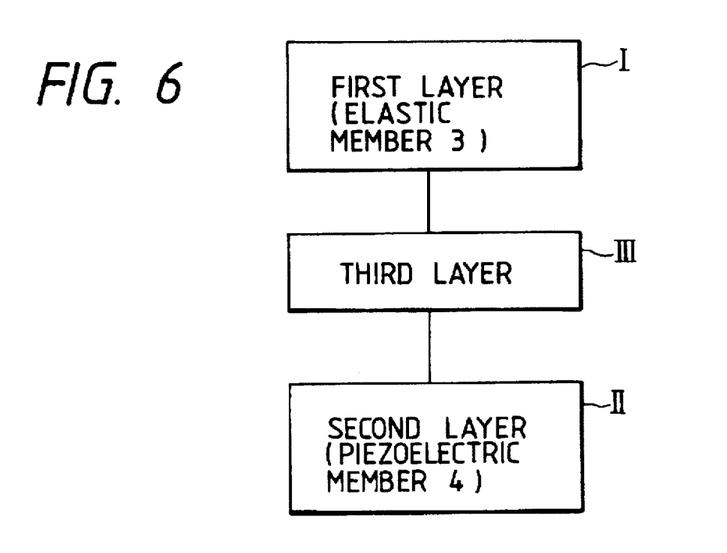
FIG. 6 is an explanatory view of a model of the first to third layers of the ultrasonic motor of the present invention.

In short, a model can be imagined in which the third layer III is provided between the first layer I (the elastic member 3) and the second layer II (the piezoelectric member 4 serving as the source of vibration), and is connected with respective layers. In this model, vibration of the piezoelectric member 4 is transmitted via the third layer III to the elastic member 3. And the vibrational energy applied to the elastic member 3 via the third layer III excites vibration in the elastic member 3.

Vibration movement of respective layers I–III which are connected as described in the above model will be now considered. Vibration condition of respective layers I–III changes according to natural frequencies and compliance of respective layers. Therefore, when the compliance of the third layer III which is provided intermediately is properly determined, it is possible to obtain a state in the model in which the layers I and II which are provided on the respective sides of the third layer III vibrate with great amplitude while the intermediate third layer III vibrates little.

Even if energy from the source of vibration is small, big vibration of the first layer I (the elastic member 3) can be obtained. In this case, the intermediate third layer III itself vibrates little and almost exclusively transmits vibrational energy, serving as an energy storage layer.

When the stator S of the ultrasonic motor is put in the above-mentioned state, the problems described above can be solved.

Further, by varying compliance of the intermediate third layer III, vibration condition of the first and second layers I and II provided on the respective sides of the third layer III can be widely changed so that vibration condition of the elastic member 3 may be widely different from that of the piezoelectric member 4.

As is clearly understood from the above description, by properly determining compliance of the first layer I (the elastic member 3), the second layer II (the piezoelectric layer 4) and the third layer III, it is possible, while efficiently applying vibrational energy from the piezoelectric member 4 to the elastic member 3, for properly determined spring of the third layer III to reduce the obstructive effect of the piezoelectric member 4 on the vibration of the travelling oscillatory wave generated in the elastic member 3. Similarly, the hindering effect of the elastic member 3 on the piezoelectric member 4 can be reduced.

The third layer III accumulates energy generated from the piezoelectric member 4 and transmits it to the elastic member 3. And the third layer III also accumulates energy of the travelling oscillatory wave generated in the elastic member 3 and transmit it to the piezoelectric member 4. Thus, the factors obstructive to vibration can be suppressed, and temperature rising of the stator S can be reduced.

As described above, the vibration loss in the stator S can be reduced by providing the third layer III between the piezoelectric member 4 and the elastic member 3, and drive efficiency of the ultrasonic motor can be improved.

Figure 7:
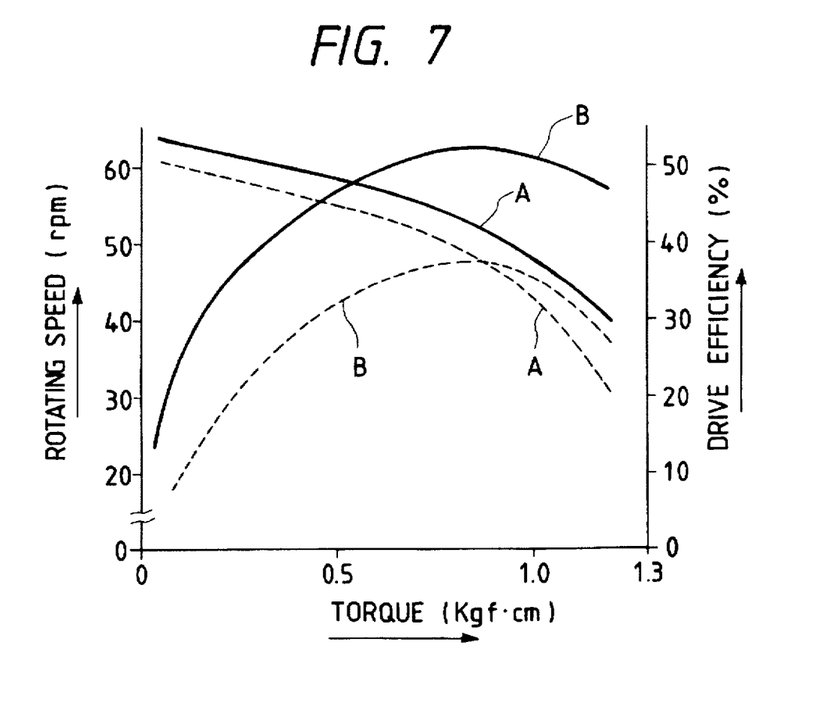
FIG. 7 is a graph showing the relation between torque (rotating speed) and drive efficiency in the first embodiment, compared with that in the conventional example.

FIG. 7 is a graph showing the relation between the torque (rotating speed) and drive efficiency of the first embodiment of the ultrasonic motor, compared with that of the conventional example.

Both this embodiment and the conventional example employ invar as the elastic member 3 and PZT as the piezoelectric member 4. The first embodiment differs from the conventional example in that a coat of epoxy-adhesive material having a thickness of about 6 μm (the adhesive material layer 6) is formed as the third layer III.

In the figure, broken lines A and B indicate the rotating speed and the drive efficiency of the conventional example, respectively. Solid lines A and B indicate the rotating speed and the drive efficiency of the first embodiment, respectively.

As is clear from the graph, according to the present invention, drive efficiency can be remarkably improved. In addition, by changing compliance of the third layer III, it is possible to produce ultrasonic motors which have different output characteristics by using the same stators and the same piezoelectric members.

Figure 8:
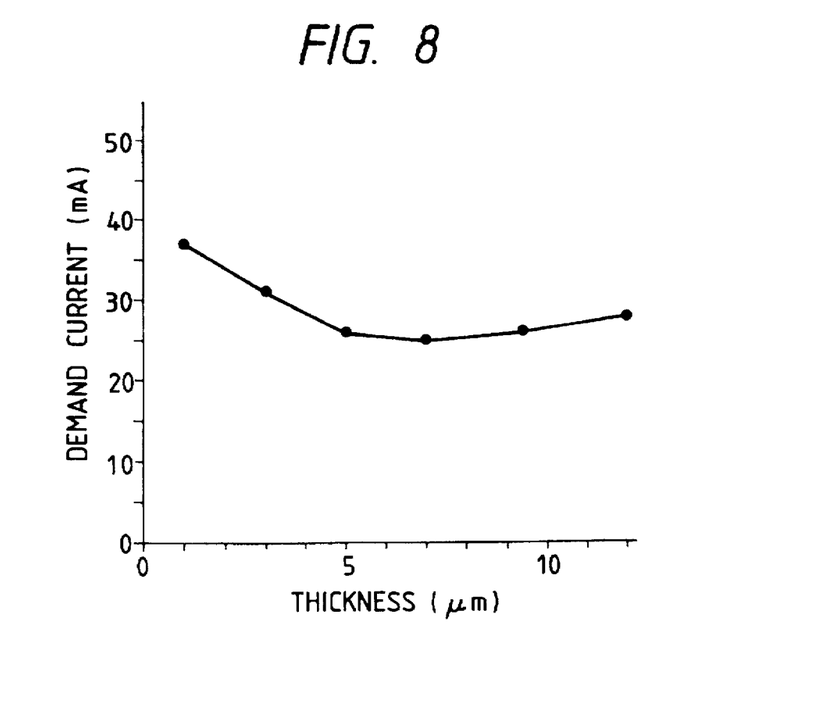
FIG. 8 is a diagram showing the relation between the thickness of the third layer and the demand current in the first embodiment.

FIG. 8 is a diagram showing the relation between the thickness of the third layer and the demand current of the ultrasonic motor according to the present invention.

The experimental result shown in FIG. 8 was obtained in the following conditions: third layer III: epoxy-adhesive material, driving speed: 60 rpm, load: 350 gfcm, power supply voltage: 30 vrms, and modulus of longitudinal elasticity: ca. 240 kgf/mm².

As is clearly shown in FIG. 8, the demand current becomes lowest when the thickness of the third layer III is about 5 to 9.5 μm.

Figure 9:
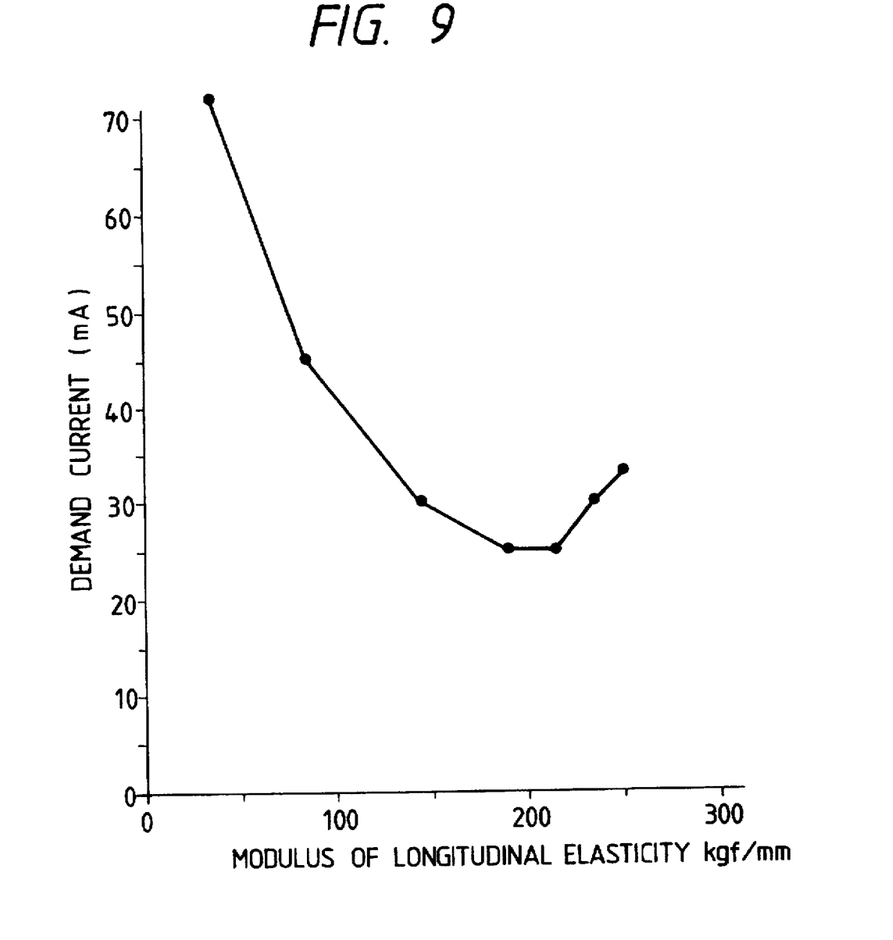
FIG. 9 is a diagram showing the relation between the modulus of longitudinal elasticity of the third layer and the demand current in the first embodiment.

FIG. 9 is a diagram showing the relation between the modulus of longitudinal elasticity of the third layer and the demand current of the ultrasonic motor according to the present invention.

The experimental result shown in FIG. 9 was obtained when two-liquid-mixing type epoxy adhesive material was used, wherein change in the demand current was measured while the mixing ratio of the main agent to the curing agent was varied as well as different brands of epoxy adhesive material were used in order to vary the modulus of longitudinal elasticity. Other conditions were driving speed: 60 rpm, load: 350 gfcm, power supply voltage 30 vrms, and thickness of the third layer III: 6 μm.

As is clearly shown in FIG. 9, the demand current becomes lowest when the modulus of longitudinal elasticity is around 200 kgf/mm².

FIGS. 10 to 15 are enlarged cross-sectional views respectively showing parts of the second to seventh embodiments of the ultrasonic motor according to the present invention. In the following description of each embodiment, the elastic member 3, the piezoelectric member 4, the electrodes 5, and so on are all the same as those in the first embodiment. These second to seventh embodiments can make the thickness of the third layer III uniform by means of simple methods.

Figure 10:
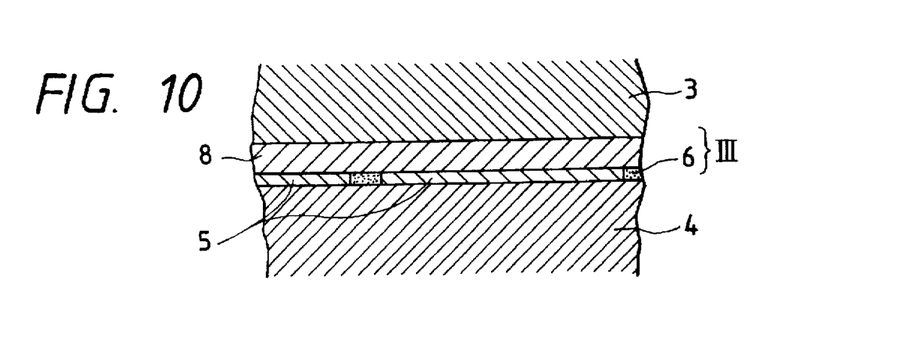
FIG. 10 is an enlarged cross-sectional view showing part of the second embodiment of the ultrasonic motor according to the present invention.

The embodiment shown in FIG. 10 employs a resin material layer 8 as the third layer, which is bonded by the adhesive material layer 6. Incidentally, the resin material layer 8 can be made not only of a kind of resin but also of other material. Also, the adhesive material layer 6 may be thickened and, together with the resin material layer 8, constitute the third layer III.

Figure 11:
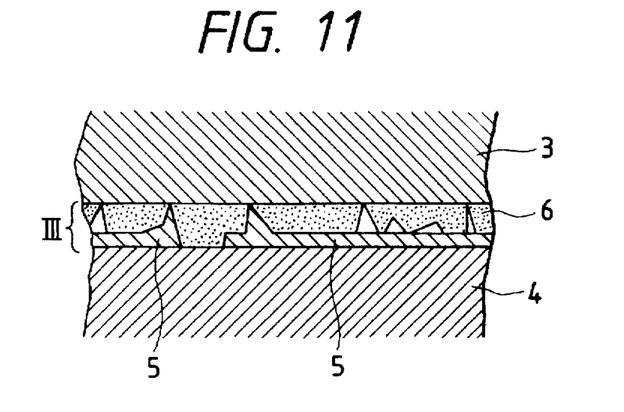
FIG. 11 is an enlarged cross-sectional view showing part of the third embodiment of the ultrasonic motor according to the present invention.

In the embodiment shown in FIG. 11, the surfaces of the electrodes 5 are roughly finished, and then the third layer III is formed on said roughly finished surfaces. In this case, the grain diameter of silver paste is varied to obtain desirable roughness, and the silver paste is printed and baked to form the electrode. Otherwise, conditions of printing and baking of silver paste may properly be determined to obtain a crater-lip-like projection formed by gas, (called "void") generated during printing and baking.

Figure 12:
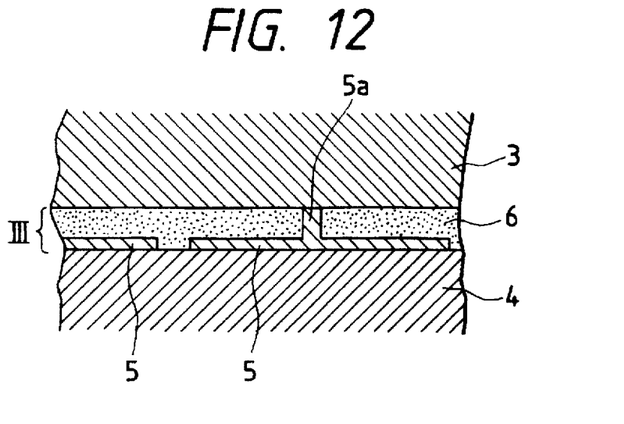
FIG. 12 is an enlarged cross-sectional view showing part of the fourth embodiment of the ultrasonic motor according to the present invention.

In the embodiment shown in FIG. 12, after printing the electrodes 5, projecting portions 5a are printed on parts of the electrodes 5 so that, the third layer III is formed.

Figure 13:
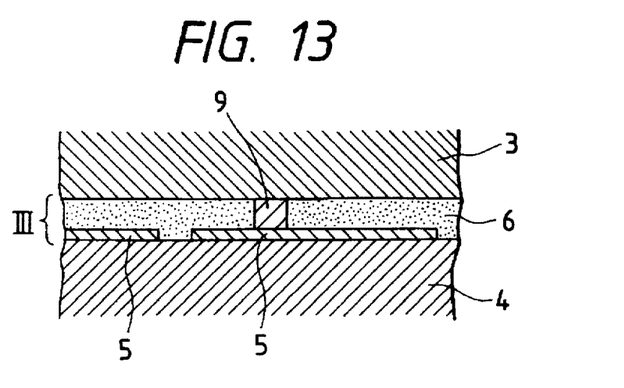
FIG. 13 is an enlarged cross-sectional view showing part of the fifth embodiment of the ultrasonic motor according to the present invention.

The embodiment shown in FIG. 13 uses spacers 9 having rectangular cross sections in order to provide the third layer III. This method can also be applied to the second embodiment, wherein the spacers are preferably positioned between adjacent electrodes to have a better effect.

Figure 14:
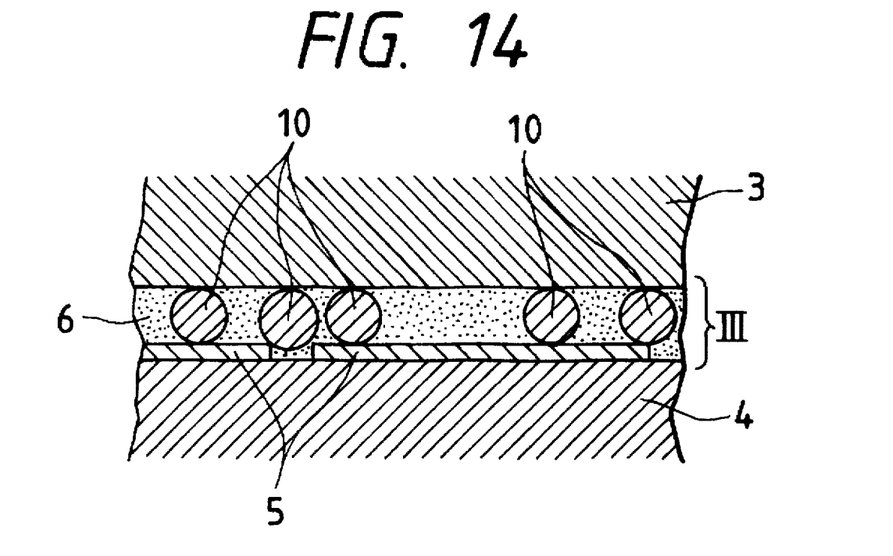
FIG. 14 is an enlarged cross-sectional view showing part of the sixth embodiment of the ultrasonic motor according to the present invention.

In the embodiment shown in FIG. 14, micro powder 10 of metal, resin, or the like is mixed with adhesive material of which the adhesive material layer 6 is formed. As the micro powder has a certain grain diameter which ensures space, the third layer III can be formed.

Figure 15:
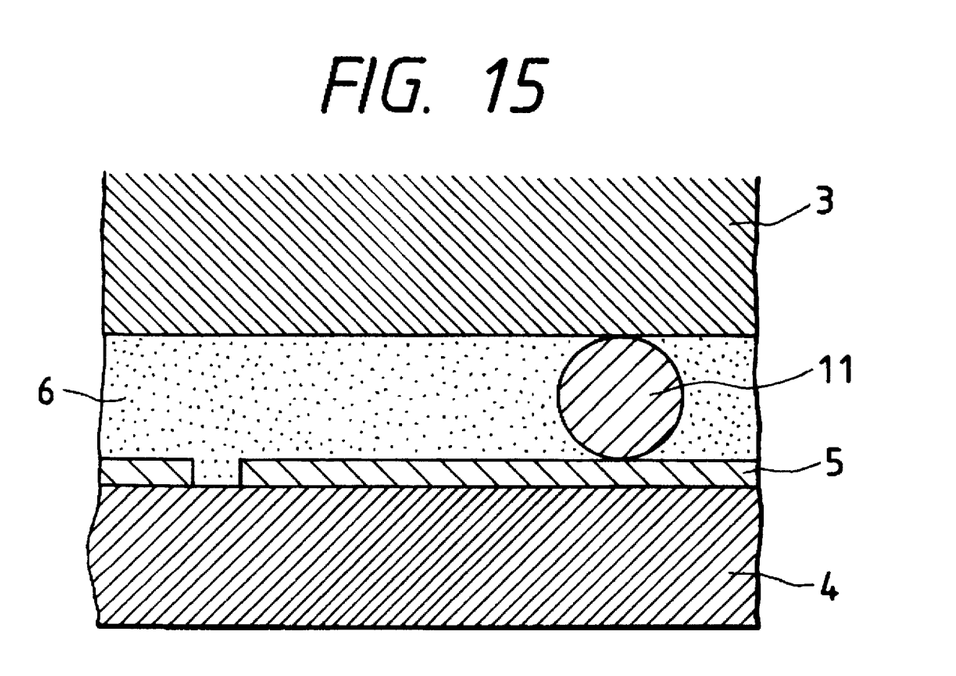
FIG. 15 is an enlarged cross-sectional view showing part of the seventh embodiment of the ultrasonic motor according to the present invention.

The embodiment shown in FIG. 15 utilzes bar-shaped member 11 having circular cross sections such as resin fibers, fine metal wires, and so on.

Figure 16:
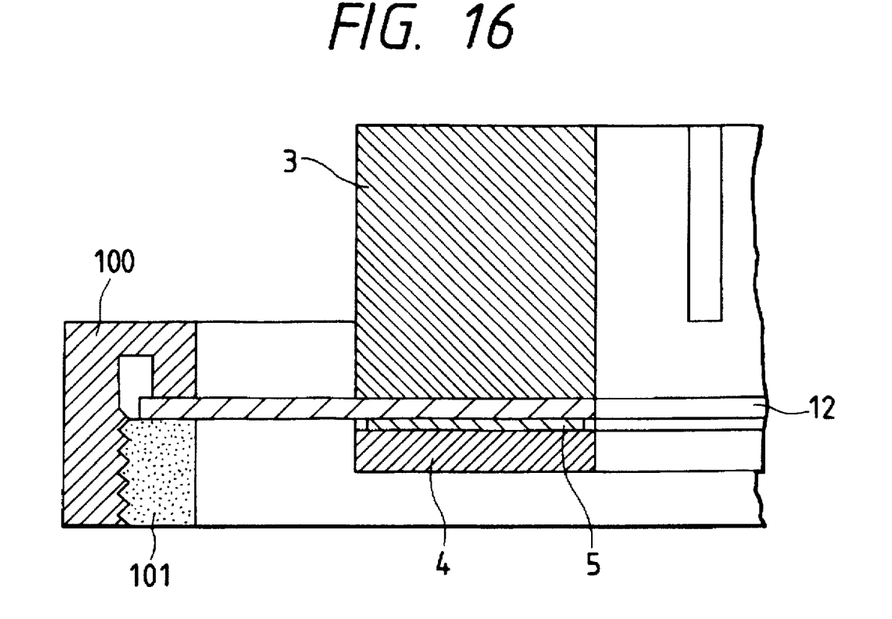
FIG. 16 is an enlarged cross-sectional view showing part of the eighth embodiment of the ultrasonic motor according to the present invention.
Figure 17:
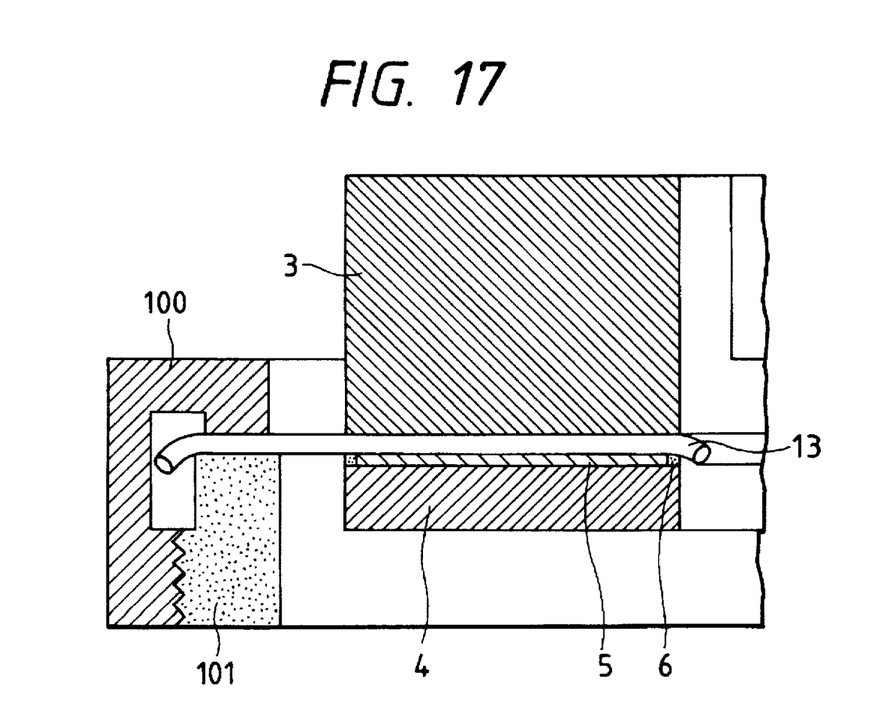
FIG. 17 is an enlarged cross-sectional view showing part of the ninth embodiment of the ultrasonic motor according to the present invention.

FIGS. 16 and 17 are enlarged cross-sectional views respectively showing parts of the eighth and ninth embodiments of the ultrasonic motor according to the present invention. These embodiments are developed from those shown in FIGS. 10 and 15, and have improved stator support systems. More specifically, compliance of a spacer 12 or a bar-shaped member 13 is properly determined so that the spacer 12 or the bar-shaped member 13 does not vibrate. And the spacer 12 or the bar-shaped member 13 is elongated outside the stator S to be supported by the support members 100 and 101.

The present invention is not limited to the above-mentioned embodiments, but includes various modifications. For example, ultrasonic motors which comprise the same elastic members and the same piezoelectric members can have different characteristics by varying the thickness of the third layer or by employing materials having different characteristics as the third layer.

As described above in detail, according to the present invention, since the third layer is provided between the first and second layers, drive efficiency can be remarkably improved, as compared with the conventional ultrasonic motor without the third layer, and temperature rising of the stator can be reduced.

Further, by elongating the third layer outside the stator to support the stator, diminution of drive efficiency due to support of the stator can be considerably small so that drive efficiency can be improved.

What is claimed is:

1. An ultrasonic motor comprising:
   a stator having an electromechanical energy conversion element which is formed with an electrode on a surface thereof, and an elastic member which is excited by said electromechanical energy conversion element; and
   a rotor which is pressure-contacted to be in contact with said stator;
   wherein said stator includes: a first layer having said elastic member; a second layer having said electromechanical energy conversion element and said electrode; and a third layer between said first layer and said electrode of said second layer and having a spring modulus smaller than those of said first and second layers, said third layer being at least 3 μm thick.

2. An ultrasonic motor according to claim 1, wherein said third layer is a buffer layer for preventing a travelling oscillatory wave from returning from the first layer to the second layer.

3. An ultrasonic motor according to claim 1, wherein said third layer is an energy storage layer which transmits vibrational energy but does not vibrate itself.

4. An ultrasonic motor according to claim 1, including spacers for ensuring the thickness of the third layer.

5. An ultrasonic motor according to claim 1, wherein said third layer is elongated outwardly to support said stator.

6. An ultrasonic motor according to claim 1, wherein said electromechanical energy conversion element is a piezoelectric member.

7. An ultrasonic motor comprising:
   a stator having an electromechanical energy conversion element which is formed with an electrode on a surface thereof, and an elastic member which is excited by said electromechanical energy conversion element to generate a vibration; and
   a driven element to be driven by said vibration;
   wherein said stator has a layer which is made of different material from those of said electromechanical energy conversion element and said elastic member, whose thickness is greater than 3 μm, and which is provided between said electrode of said electromechanical energy conversion element and the elastic member.

8. An ultrasonic vibration motor comprising:
   a stator having an electromechanical energy conversion element which is formed with an electrode on a surface thereof, and an elastic member which is excited by said electromechanical energy conversion element to generate a vibration; and
   a driven element to be driven by said vibration,
   wherein said stator has a layer with a different mechanical property from those of the electromechanical energy conversion element and the elastic member and disposed between said electrode of the electromechanical energy conversion element and the elastic member,
   characteristics of the ultrasonic motor being determined in accordance with the material and the thickness of said layer, the thickness of said layer being greater than 3 μm.

9. An ultrasonic vibration motor comprising:
   a stator having an electromechanical energy conversion element which is formed with an electrode on a surface thereof, and an elastic member which is excited by said electromechanical energy conversion element to generate a vibration; and
   a driven member which is pressure-contacted to be in contact with said stator and is driven by said vibration;
   wherein said stator includes: a first layer having said elastic member; a second layer having said electromechanical energy conversion element and said electrode; and a third layer disposed between said first layer and said electrode of said second layer, said third layer having a spring modulus smaller than those of said first and second layers and a thickness greater than 3 μm such that said third layer is effective to substantially suppress obstruction of the vibration by said second layer.

10. An ultrasonic vibration motor comprising:
    a stator having an electromechanical energy conversion element having an electrode on a surface thereof, and an elastic member which is excited by said electromechanical energy conversion element to generate a vibration; and
    a driven element to be driven by said vibration;
    wherein said stator includes a layer disposed between said elastic member and said electrode of said electromechanical energy conversion element, and which has a different mechanical property from those of said electromechanical energy conversion element and said elastic member and further has a thickness greater than 3 μm which is effective to substantially suppress obstruction of the vibration by said electromechanical energy conversion element.

11. A method of improving drive performance of an ultrasonic motor including a stator having an electromechanical energy conversion element which is formed with an electrode on a surface thereof and an elastic member which is excited by said electromechanical energy conversion element to generate a vibration; and a driven element to be driven by said vibration, said method comprising:

providing, between the electrode of the electromechanical energy conversion element and the elastic member, a layer greater than 3 μm thick of material having a different mechanical property from those of the electromechanical energy conversion element and the elastic member, and which is effective to substantially suppress obstruction of the vibration by the electromechanical energy conversion element.

12. An ultrasonic motor according to claim 1, wherein said third layer is greater than 4 μm thick.

13. An ultrasonic motor according to claim 12, wherein said third layer has a modulus of longitudinal elasticity of from about 80 to about 250 kgf/mm².

14. An ultrasonic motor according to claim 1, wherein said third layer is at least about 5 μm thick.

15. An ultrasonic motor according to claim 1, wherein said third layer is from about 5 to about 9.5 μm thick.

16. An ultrasonic motor according to claim 1, wherein said third layer has a modulus of longitudinal elasticity of from about 80 to about 250 kgf/mm².

17. An ultrasonic motor according to claim 7, wherein the thickness of said layer is greater than 4 μm.

18. An ultrasonic motor according to claim 17, wherein said layer has a modulus of longitudinal elasticity of from about 80 to about 250 kgf/mm².

19. An ultrasonic motor according to claim 7, wherein the thickness of said layer is at least about 5 μm.

20. An ultrasonic motor according to claim 7, wherein the thickness of said layer is from about 5 to about 9.5 μm.

21. An ultrasonic motor according to claim 7, wherein said layer has a modulus of longitudinal elasticity of from about 80 to about 250 kgf/mm².

22. An ultrasonic vibration motor according to claim 8, wherein the thickness of said layer is greater than 4 μm.

23. An ultrasonic vibration motor according to claim 22, wherein said layer has a modulus of longitudinal elasticity of from about 80 to about 250 kgf/mm².

24. An ultrasonic vibration motor according to claim 8, wherein the thickness of said layer is at least about 5 μm.

25. An ultrasonic vibration motor according to claim 8, wherein the thickness of said layer is from about 5 to about 9.5 μm.

26. An ultrasonic vibration motor according to claim 8, wherein said layer has a modulus of longitudinal elasticity of from about 80 to about 250 kgf/mm².

27. An ultrasonic vibration motor according to claim 9, wherein the thickness of said third layer is greater than 4 μm.

28. An ultrasonic vibration motor according to claim 27, wherein said third layer has a modulus of longitudinal elasticity of from about 80 to about 250 kgf/mm².

29. An ultrasonic vibration motor according to claim 9, wherein the thickness of said third layer is at least about 5 μm.

30. An ultrasonic vibration motor according to claim 9, wherein the thickness of said third layer is from about 5 to about 9.5 μm.

31. An ultrasonic vibration motor according to claim 9, wherein said third layer has a modulus of longitudinal elasticity of from about 80 to about 250 kgf/mm².

32. An ultrasonic vibration motor according to claim 10, wherein the thickness of said layer is greater than 4 μm.

33. An ultrasonic vibration motor according to claim 32, wherein said layer has a modulus of longitudinal elasticity of from about 80 to about 250 kgf/mm².

34. An ultrasonic vibration motor according to claim 10, wherein the thickness of said layer is at least about 5 μm.

35. An ultrasonic vibration motor according to claim 10, wherein the thickness of said layer is from about 5 to about 9.5 μm.

36. An ultrasonic vibration motor according to claim 10, wherein said layer has a modulus of longitudinal elasticity of from about 80 to about 250 kgf/mm².

37. A method according to claim 11, wherein said layer is greater than 4 μm thick.

38. A method according to claim 37, wherein said layer has a modulus of longitudinal elasticity of from about 80 to about 250 kgf/mm².

39. A method according to claim 11, wherein said layer is at least about 5 μm thick.

40. A method according to claim 11, wherein said layer is from about 5 to about 9.5 μm thick.

41. A method according to claim 11, wherein said layer has a modulus of longitudinal elasticity of from about 80 to about 250 kgf/mm².

42. An ultrasonic motor according to claim 17, wherein said layer has a modulus of longitudinal elasticity of at least about 80 kgf/mm² but smaller than those of said electromechanical energy conversion element and said elastic member.

* * * * *